United States Patent
Bru et al.

(10) Patent No.: US 12,250,902 B2
(45) Date of Patent: Mar. 18, 2025

(54) TRANSMISSION FOR PEDESTRIAN-CONTROLLED WHEELED VEHICLE AND WHEELED VEHICLE EQUIPPED WITH SUCH A TRANSMISSION

(71) Applicant: FRANCE REDUCTEURS, Les Herbiers (FR)

(72) Inventors: Pierre Bru, Sevremoine (FR); Nicolas Didier, Mouchamps (FR)

(73) Assignee: FRANCE REDUCTEURS, Les Herbiers (FR)

( * ) Notice: Subject to any disclaimer, the term of this patent is extended or adjusted under 35 U.S.C. 154(b) by 19 days.

(21) Appl. No.: 17/765,578

(22) PCT Filed: Sep. 29, 2020

(86) PCT No.: PCT/FR2020/051706
§ 371 (c)(1),
(2) Date: Mar. 31, 2022

(87) PCT Pub. No.: WO2021/064322
PCT Pub. Date: Apr. 8, 2021

(65) Prior Publication Data
US 2023/0023943 A1 Jan. 26, 2023

(30) Foreign Application Priority Data
Oct. 3, 2019 (FR) ................................. 1910942

(51) Int. Cl.
*A01D 34/69* (2006.01)
*A01D 34/68* (2006.01)
(Continued)

(52) U.S. Cl.
CPC ......... *A01D 34/69* (2013.01); *A01D 34/6812* (2013.01); *F16D 41/22* (2013.01);
(Continued)

(58) Field of Classification Search
CPC ........ A01D 34/6812; A01D 2034/6837; A01D 69/08; A10D 34/69; F16D 41/18–185;
(Continued)

(56) References Cited

U.S. PATENT DOCUMENTS 1,462,204 A * 7/1923 Frank ...................... F16D 41/22
74/650
2,458,089 A * 1/1949 McFariane .............. F16H 48/16
74/650
(Continued)

FOREIGN PATENT DOCUMENTS

AU 2009100186 3/2009
FR 3036447 11/2016

OTHER PUBLICATIONS

International Search Report dated Nov. 26, 2020.

*Primary Examiner* — James J Taylor, II
(74) *Attorney, Agent, or Firm* — IPSILON USA, LLP

(57) ABSTRACT

A transmission for a wheeled vehicle has a drive member, a rotatable driven member in permanent engagement with the drive member, a wheel drive shaft and, disposed between the wheel drive shaft and the driven member, a clutch mechanism. A part of the clutch mechanism which, in the deactivated state of the clutch mechanism, is disposed in a position close to the driven member, is, in the position, limited in its axial movement in the direction of a separation from the driven member in the reverse drive state of the driven member.

13 Claims, 8 Drawing Sheets

(51) Int. Cl.
  *F16D 41/22*  (2006.01)
  *F16H 48/14*  (2006.01)
  *F16H 48/16*  (2006.01)

(52) U.S. Cl.
  CPC .... *A01D 2034/6837* (2013.01); *F16H 48/142* (2013.01); *F16H 48/16* (2013.01)

(58) Field of Classification Search
  CPC ........ F16D 41/22; F16H 48/12; F16H 48/142; F16H 48/16; F16H 48/147
  See application file for complete search history.

(56) References Cited

U.S. PATENT DOCUMENTS

| | | | | |
|---|---|---|---|---|
| 7,665,589 | B2* | 2/2010 | Blanchard | A01D 34/69 192/54.5 |
| 7,669,702 | B2* | 3/2010 | Blanchard | F16H 48/16 74/650 |
| 8,240,449 | B2* | 8/2012 | Shinagawa | F16D 41/22 188/134 |
| 9,759,300 | B2* | 9/2017 | Barendrecht | F16H 37/0813 |
| 10,130,031 | B2* | 11/2018 | Yoshimura | A01D 34/6812 |

* cited by examiner

TRANSMISSION FOR PEDESTRIAN-CONTROLLED WHEELED VEHICLE AND WHEELED VEHICLE EQUIPPED WITH SUCH A TRANSMISSION

RELATED APPLICATION

This application is a National Phase of PCT/FR2020/051706 filed on Sep. 29, 2020, which claims the benefit of priority from French Patent Application No. 19 10942, filed on Oct. 3, 2019, the entirety of which are incorporated by reference.

FIELD OF THE INVENTION

The present invention relates to a transmission for a pedestrian-controlled wheeled vehicle, and to a wheeled vehicle equipped with such a transmission.

It relates more particularly to a transmission for a pedestrian-controlled wheeled vehicle comprising a driving member, a rotary driven member, such as a toothed wheel, permanently engaged with the driving member, means for driving the wheels of a same pair of wheels of the vehicle, said driving means comprising a wheel drive shaft produced in a single piece or in at least two coaxial wheel drive shaft sections capable of each driving a wheel of a same pair of wheels of the vehicle, and disposed between the wheel drive shaft or each of the wheel drive shaft sections and the driven member, a clutch mechanism, the or each clutch mechanism comprising at least one part that can be displaced axially, on the wheel drive shaft or the wheel drive shaft section with which said clutch mechanism cooperates, between a position away from the driven member and a position close to the driven member, the position away from the driven member corresponding to an activated state of the corresponding clutch mechanism, the position close to the driven member corresponding to a deactivated state of the corresponding clutch mechanism, the or each clutch mechanism being activated by driving the driven member in rotation in a first, so-called forward, rotational driving direction, and being able to be deactivated by driving the driven member in rotation in a second, so-called reverse, direction of rotation counter to said first direction of rotation, or by driving the wheel drive shaft or the wheel drive shaft section with which it cooperates in forward rotation, when the speed of rotation of the wheel drive shaft or the wheel drive shaft section is greater than the speed of rotation of the driven member, the wheel drive shaft or each wheel drive shaft section being, when the corresponding clutch mechanism is in the deactivated state, free to turn in either one of its directions of rotation.

DESCRIPTION OF RELATED ART

Such transmissions incorporate a so-called automatic clutch which, for its operation, does not require a dedicated control member, such as a fork, as is the case in traditional clutches. These so-called automatic clutches are particularly sensitive, so the manufacturers are constantly seeking solutions that make it possible to enhance their reliability and their efficiency.

OBJECTS AND SUMMARY

One aim of the present invention is therefore to propose a transmission of the abovementioned type, the design of which makes it possible to enhance the reliability of the clutch mechanisms.

To that end, the subject of the invention is a transmission for a pedestrian-controlled wheeled vehicle, comprising a driving member, a rotary driven member, such as a toothed wheel, permanently engaged with the driving member, means for driving the wheels of a same pair of wheels of the vehicle, said driving means comprising a wheel drive shaft produced in a single piece or in at least two coaxial wheel drive shaft sections capable of each driving a wheel of a same pair of wheels of the vehicle, and disposed between the wheel drive shaft or each of the wheel drive shaft sections and the driven member, a clutch mechanism, the or each clutch mechanism comprising at least one part mounted to be axially mobile, on the wheel drive shaft or the wheel drive shaft section with which said clutch mechanism cooperates, between a position away from the driven member and a position close to the driven member, the position away from the driven member corresponding to an activated state of the corresponding clutch mechanism, the position close to the driven member corresponding to a deactivated state of the corresponding clutch mechanism, the or each clutch mechanism being a so-called automatic clutch mechanism that can be activated by driving the driven member in rotation in a first, so-called forward, rotational driving direction, and that can be deactivated by driving the driven member in rotation in a second, so-called reverse, direction of rotation counter to said first direction of rotation, or by driving the wheel drive shaft or the wheel drive shaft section with which it cooperates in forward rotation when the speed of rotation of the wheel drive shaft or the wheel drive shaft section is greater than the speed of rotation of the driven member, the wheel drive shaft or each wheel drive shaft section being, when the corresponding clutch mechanism is in the deactivated state, free to turn in either one of its directions of rotation, characterized in that said at least one part of the or each clutch mechanism disposed, when the corresponding clutch mechanism is in the deactivated state, in a position close to the driven member, is, in said position, limited in axial displacement in the direction of a movement away from the driven member, when the driven member is in the reversely driven state.

A so-called automatic clutch is understood to be a clutch which does not require, for its operation, a dedicated control member, such as a fork, as is the case in traditional clutches.

The transmission comprises an activatable/deactivatable system for limiting the axial displacement of said at least one part of the or each clutch mechanism in the direction of a movement away from the driven member when said at least one part is in the state positioned close to the driven member corresponding to the deactivated state of the clutch mechanism, this system for limiting the axial displacement of said at least one part being active when the driven member is in the reversely driven state.

Limiting the axial displacement of at least one part of the clutch mechanism when the clutch mechanism is in the deactivated, that is to say declutched, state and when the driven member is in the reversely driven state makes it possible to prevent an undesired activation, that is to say clutching, of said clutch mechanism when the driven member is being driven in reverse.

According to one embodiment of the invention, said at least one part of the or each clutch mechanism disposed, when the corresponding clutch mechanism is in the deactivated state, in a position close to the driven member, comprises, for limiting the axial displacement thereof in the direction of a movement away from the driven member, retaining elements borne by said part, these retaining elements being configured to, when said part is in a position close to the driven member and when the driven member is in the reversely driven state, engage with complementary retaining elements borne by the driven member. In other words, the activatable/deactivatable system for limiting axial displacement of said at least one part of the or each clutch mechanism in the direction of a movement away from the driven member, when said at least one part is in the state positioned close to the driven member corresponding to the deactivated state of the clutch mechanism, comprises retaining elements borne by said part, these retaining elements being configured to, when said part is in a position close to the driven member and when the driven member is in the reversely driven state, engage with complementary retaining elements borne by the driven member. This limiting of the axial displacement of a part of the clutch mechanism with respect to the driven member by cooperation of complementary geometrical forms makes it possible to simply prevent an undesired activation of said clutch mechanism when the clutch mechanism is in the deactivated state and when the driven member is in the reversely driven state.

According to one embodiment of the invention, the retaining elements borne by said part are disposed on a circle with a center situated at the wheel drive shaft.

According to one embodiment of the invention, the retaining elements borne by said part take the form of hooks.

According to one embodiment of the invention, said at least one part of the or each clutch mechanism, disposed, when the corresponding clutch mechanism is in the deactivated state, in a position close to the driven member, take the form of a clutch plate mounted, on said wheel drive shaft or wheel drive shaft section, so as to be free to rotate and axially mobile, and the retaining elements borne by said part are disposed protruding from the face of the plate opposite the driven member.

According to one embodiment of the invention, said at least one part of the or each clutch mechanism is disposed, when the corresponding clutch mechanism is in the activated state, away from the driven member and engaged with an element borne by, and secured in rotation to, the drive shaft or drive shaft section, and, when the corresponding clutch mechanism is in the deactivated state, close to the driven member and uncoupled from the element borne by, and secured in rotation to, the wheel drive shaft or the wheel drive shaft section.

The or each so-called automatic clutch mechanisms, that can be activated by driving the driven member in rotation in a first, so-called forward, rotational driving direction, is configured to allow, when said driven member is in the state driven in forward rotation by bearing contact of the driven member and of said at least one axially mobile part of the or each clutch mechanism, an axial displacement of said axially mobile part in the direction of a movement away from the driven member. This axial displacement of said axially mobile part in the direction of a movement away from the driven member corresponds to a transition of the associated clutch mechanism from the deactivated state to the activated state. The or each so-called automatic clutch mechanism, that can be deactivated by driving the driven member in rotation in a second, so-called reverse, direction of rotation counter to said first rotational driving direction, is configured to allow, when said driven member is in the reversely driven state, by bearing contact of said at least one part of the or each clutch mechanism and of the element borne by, and secured in rotation to, the wheel drive shaft or wheel drive shaft section, an axial displacement of said axially mobile part in the direction of a movement toward the driven member. This axial displacement of said axially mobile part in the direction of a movement toward the driven member corresponds to the transition of the associated clutch mechanism from the activated state to the deactivated state.

According to one embodiment of the invention, said at least one part of the or each clutch mechanism which has the form of a clutch plate and the driven member, which preferably takes the form of a toothed wheel, are provided, on each of their faces, with ramps, the ramps of a face of the plate cooperating, when the clutch mechanism transitions from the deactivated state to the activated state, with the ramps of the driven member for an axial displacement of the clutch plate in a first direction of movement away from the driven member and securing of the plate with the element borne by, and secured in rotation to, the wheel drive shaft or wheel drive shaft section, the ramps of the other face of the plate cooperating, when the clutch mechanism transitions from the activated state to the deactivated state, with ramps of the element borne by, and secured in rotation to, the wheel drive shaft or wheel drive shaft section to bring about, by axial displacement in the opposite direction of said clutch plate, the free-wheeling of the wheel drive shaft or wheel drive shaft section.

According to one embodiment of the invention, the ramps of a face of the clutch plate which cooperate, when the clutch mechanism transitions from the deactivated state to the activated state, with the ramps of the driven member for an axial displacement of the clutch plate in a first direction of movement away from the driven member, are formed on the retaining elements borne by said clutch plate.

According to one embodiment of the invention, the ramps of the driven member with which the ramps of a face of the clutch plate cooperate, when the clutch mechanism transitions from the deactivated state to the activated state, for an axial displacement of the clutch plate in a first direction of movement away from the driven member, are formed on the complementary retaining elements borne by the driven member.

According to one embodiment of the invention, the retaining elements borne by said part have the overall shape of an L and comprise a first branch starting on the clutch plate and extending orthogonally to the clutch plate in a direction parallel to the wheel drive shaft and a second branch orthogonal to the first branch.

According to one embodiment of the invention, the or at least one of the clutch mechanisms, the complementary retaining elements of the driven member with which the retaining elements borne by the at least one part of said clutch mechanism engage, when said part is in a position close to the driven member and when the driven member is in the reversely driven state, take the form of hooks disposed on a circle with a center situated at the wheel drive shaft, said hooks of the driven member being configured to interpenetrate with the retaining elements of said at least one part of said clutch mechanism when said retaining elements are in the state engaged with the complementary retaining elements.

According to one embodiment of the invention, the transmission comprises a motor system for driving the driving member in rotation configured to allow, on the one hand, the driven member to be driven in the forward driving direction and, on the other hand, the driven member to be driven in the reverse driving direction.

According to one embodiment of the invention, it comprises a control system of the motor system for driving the driving member in rotation.

Yet another subject of the invention is a pedestrian-controlled wheeled vehicle, such as a lawnmower, characterized in that it is equipped with a transmission of the abovementioned type.

BRIEF DESCRIPTION OF THE DRAWINGS

The invention will be well understood on reading the following description of exemplary embodiments, with reference to the attached drawings in which.

DETAILED DESCRIPTION

Figure 1:
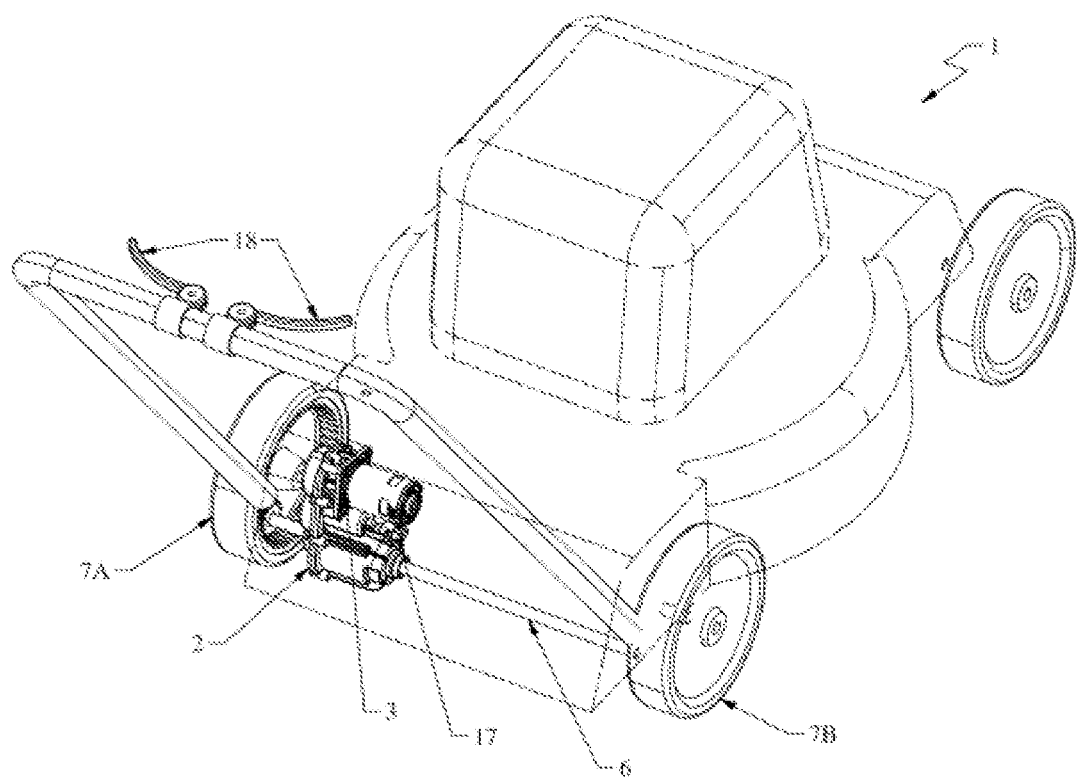
FIG. 1 represents a perspective view of a vehicle according to the invention.

As mentioned above, the transmission 2, the subject of the invention, is more particularly intended to be applied to a wheeled vehicle 1, notably a pedestrian-controlled wheeled vehicle. FIG. 1 represents the application of such a transmission 2 to a lawnmower. This lawnmower comprises a wheeled chassis, the rear wheels of the chassis being represented as 7A, 7B in the figures.

Figure 2A:
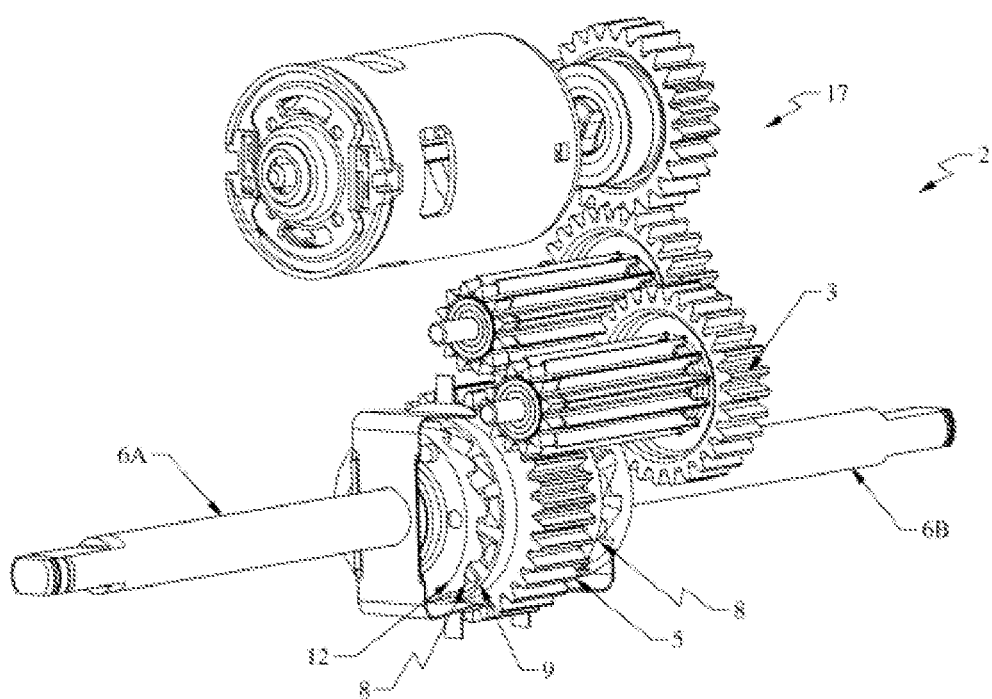
FIG. 2A represents a partial view of a transmission according to the invention in which the wheel drive shaft is formed by two shaft sections.
Figure 2B:
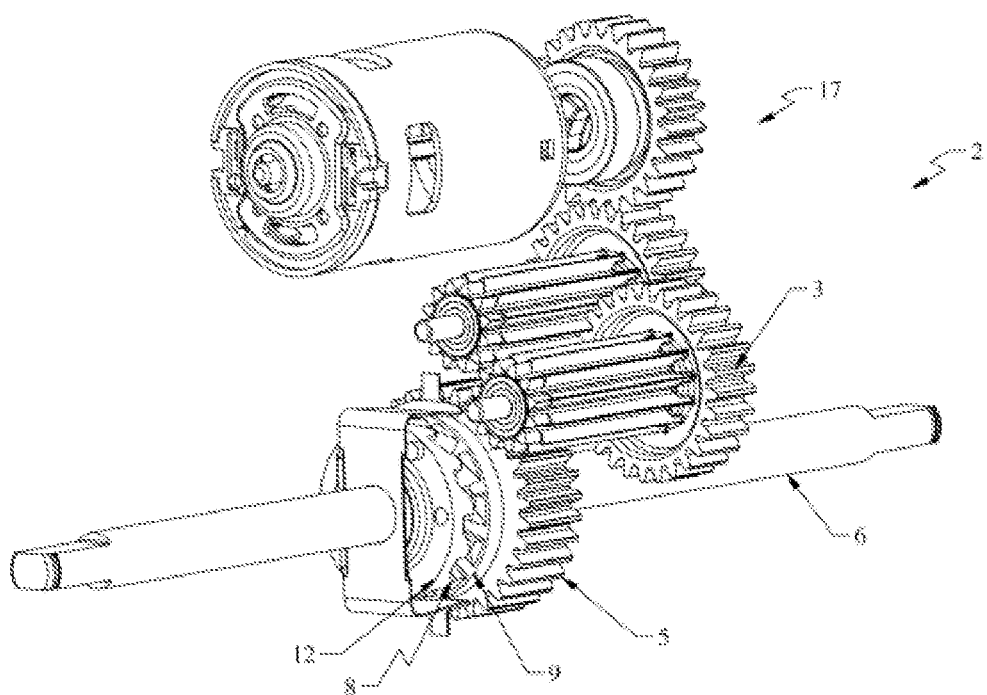
FIG. 2B represents a partial view of a transmission according to the invention in which the wheel drive shaft is produced in a single piece.

This transmission 2 can be housed at least partially in a housing generally made of synthetic material. This transmission 2 comprises a driving member 3 formed here by a drive pinion. This driving member 3 could, in an equivalent manner, have been produced for example in the form of a worm screw. This driving member 3 is a rotary member. This driving member 3 is driven in rotation by a motor system 17 for driving the driving member 3 with which the vehicle 1 is equipped in rotation. This system 17 for driving the driving member 3 in rotation comprises a motor with two directions of rotation and gears coupling the output shaft of the motor with the driving member 3 for driving the driving member 3 in rotation in a first direction of rotation, the so-called forward direction of the vehicle, and a second, opposite direction of rotation, called reverse. The driving member 3 is permanently engaged by meshing with a rotary driven member 5 produced in the form of a toothed wheel that is holed centrally so to be able to be threaded onto a shaft 6 which forms the drive shaft of the wheels 7A and 7B of the vehicle 1. This driven member 5 is mounted to rotate freely on said wheel drive shaft 6. The driven member 5 can be driven in rotation by the driving member 3 in two directions of rotation, namely a first, so-called forward, rotational driving direction, and a second, so-called reverse, rotational driving direction. The wheel drive shaft 6 can be produced in a single piece as illustrated in FIG. 2B. The wheel drive shaft 6 can also be formed by at least two coaxial wheel drive shaft sections 6A, 6B each capable of driving a wheel 7A, 7B of a same pair of wheels of the vehicle.

These shaft sections 6A, 6B are kept aligned by holding means and are, in the aligned state, capable of being driven by a relative rotational displacement. The holding means are, for example, formed by a linking pin coupled at each of its ends by fitting to a wheel drive shaft section.

These drive shaft sections 6A, 6B extend, in the examples represented, parallel to the motor shaft of the motor system 17 for driving of the driving member 3 in rotation. At the ends of the wheel drive shaft sections 6A, 6B there can be disposed, each time, a drive pinion intended to engage with a drive pinion borne by each wheel 7A, 7B of the vehicle. Obviously, other means for transmitting the movement of the wheel drive shaft section 6A or respectively 6B to the wheel 7A or respectively 7B can be provided without departing from the scope of the invention. The production of the wheel drive shaft in the form of two shaft sections allows each wheel of the pair of wheels to turn independently of the other wheel of the pair of wheels.

The transmission 2 also comprises, disposed between the wheel drive shaft 6 or each of the wheel drive shaft sections 6A, 6B and the driven member 5, a clutch mechanism 8. Thus, in the case of a wheel drive shaft 6 produced in a single piece, the transmission 2 comprises only a single clutch mechanism 8 for transmitting the movement of the driven member 5 to said shaft 6. In the case of a wheel drive shaft 6 formed by at least two shaft sections 6A, 6B, the transmission 2 comprises two clutch mechanisms 8, one disposed between the driven member 5 and the wheel drive shaft section 6A, and the other disposed between the driven member 5 and the wheel drive shaft section 6B. These clutch mechanisms 8 are capable of transmitting, for one of them, the transmission of the movement of the driven member 5 to the wheel drive shaft section 6A, and for the other, the transmission of the movement of the driven member 5 to the wheel drive shaft section 6B. Thus, the toothed wheel, forming the driven member 5, disposed coaxially to the wheel drive shaft sections 6A, 6B, is disposed between two clutch mechanisms 8, each clutch mechanism 8 being borne, at least partially, by one of the wheel drive shaft sections 6A or 6B.

Independently of the number of clutch mechanisms 8, the design and the operation of each clutch mechanism 8 are similar. The or each clutch mechanism 8 therefore comprises at least one part 9 that can be axially displaced on the wheel drive shaft 6 or the wheel drive shaft sections 6A or 6B with which said clutch mechanism 8 cooperates between a position away from the driven member 5 and a position close to the driven member 5. The position of the part 9 away from the driven member 5 corresponds to an activated state, that is to say the clutched state of the corresponding clutch mechanism 8, a state in which the movement of the driven member 5 can be transmitted to the wheel drive shaft 6. The position of the part 9 close to the driven member 5 corresponds to a deactivated state of the corresponding clutch mechanism 8, that is to say a declutched state, in which the movement of the driven member 5 cannot be transmitted to the wheel drive shaft 6. Said at least one part 9 of the or each clutch mechanism 8 disposed, when the corresponding clutch mechanism 8 is in the deactivated state, in a position close to the driven member 5 is disposed, when the corresponding clutch mechanism 8 is in the activated state, away from the driven member 5 and engaged with an element 12 borne by and secured in rotation to the drive shaft 6 or drive shaft section 6A, 6B. This part 9 of the or each clutch mechanism 8 is also, when the corresponding clutch mechanism 8 is in the deactivated state, close to the driven member 5 and uncoupled from the element 12 borne by and secured in rotation to the wheel drive shaft 6 or the wheel drive shaft section 6A, 6B. This part 9 of the or each clutch mechanism 8 is therefore axially mobile in the direction of a movement toward and away from the driven member 5 so as to be able to be moved away from or toward the element 12 secured in rotation to the wheel drive shaft. The or each so-called automatic clutch mechanism 8, that can be activated by driving the driven member 5 in rotation in a first, so-called forward, rotational driving direction, is therefore configured to allow, when said driven member is in the state driven in forward rotation by bearing contact of the driven member 5 and of said at least one axially mobile part 9 of the associated clutch mechanism 8, an axial displacement of said axially mobile part 9 in the direction of a movement away from the driven member 5. This axial displacement of said axially mobile part 9 in the direction of a movement away from the driven member 5 corresponds to the transition of the associated clutch mechanism from the deactivated state to the activated state. The or each so-called automatic clutch mechanism, that can be deactivated by driving the driven member 5 in rotation in a second direction of rotation, so-called reverse, counter to said first rotational driving direction, is configured to allow, when said driven member 5 is in the state driven in reverse rotation, by bearing contact of said at least one part 9 of the associated clutch mechanism 8 and of the element 12 borne by, and secured in rotation to, the wheel drive shaft or drive shaft section, an axial displacement of said axially mobile part 9 in the direction of a movement close to the driven member 5. This axial displacement of said axially mobile part 9 in the direction of a movement toward the driven member 5 corresponds to the transition of the associated clutch mechanism 8 from the activated state to the deactivated state. In the examples represented, said at least one part 9 of the or each clutch mechanism 8 disposed, when the corresponding clutch mechanism 8 is in the deactivated state, in a position close to the driven member 5 takes the form of a clutch plate 91 mounted on said wheel drive shaft 6 or wheel drive shaft section 6A, 6B, free to rotate and axially mobile. The element 12 with which the clutch plate 91 can engage when the corresponding clutch mechanism 8 is in the activated state also takes the form for example of a plate that is centrally holed so as to be able to be threaded onto the wheel drive shaft 6. This element 12 is secured in rotation to the wheel drive shaft 6 by a pin or splines or by any other shaft/wheel link type. This element 12 is axially fixedly mounted on the wheel drive shaft 6. To allow an axial displacement of the clutch plate 91, the clutch plate 91 and the driven member 5, which here takes the form of a toothed wheel, are provided, for the clutch plate 91 on each of its faces, and for the driven member 5 on at least one of its faces, with ramps. These ramps ensure the bearing contact between part 9 and driven member 5 so as to allow an activation of the clutch mechanism. The ramps 13 of one face of the plate 91 cooperate, when a clutch mechanism 8 transitions from the deactivated state to the activated state, with the ramps 14 of the driven member 5 for an axial displacement of the clutch plate 91 in a first direction of movement away from the driven member 5 and securing of the plate 91 with the element 12 borne by, and secured in rotation to, the wheel drive shaft section 6A or 6B which bears with said clutch mechanism 8. The ramps 15 of the other face of the plate 91 cooperate, when the clutch mechanism transitions from the activated state to the deactivated state, with ramps 16 of the element 12 borne by, and secured in rotation to, the wheel drive shaft 6A or 6B which bears said clutch mechanism 8 so as to bring about, by axial displacement in an opposite direction of said clutch plate 91, the free-wheeling of the wheel drive shaft section 6A or 6B bearing the clutch mechanism. Once again, these ramps ensure the bearing contact between the part 9 and the element 12 so as to allow a deactivation of the clutch mechanism. As the driven member 5 can comprise ramps on both of its faces, it is capable of cooperating with the clutch plate of each of the clutch mechanisms 8.

The ramps of the driven member 5 and of the clutch plate 9 are, here, formed by one of the flanks of crenelations or teeth protruding from said faces.

Figure 3A:
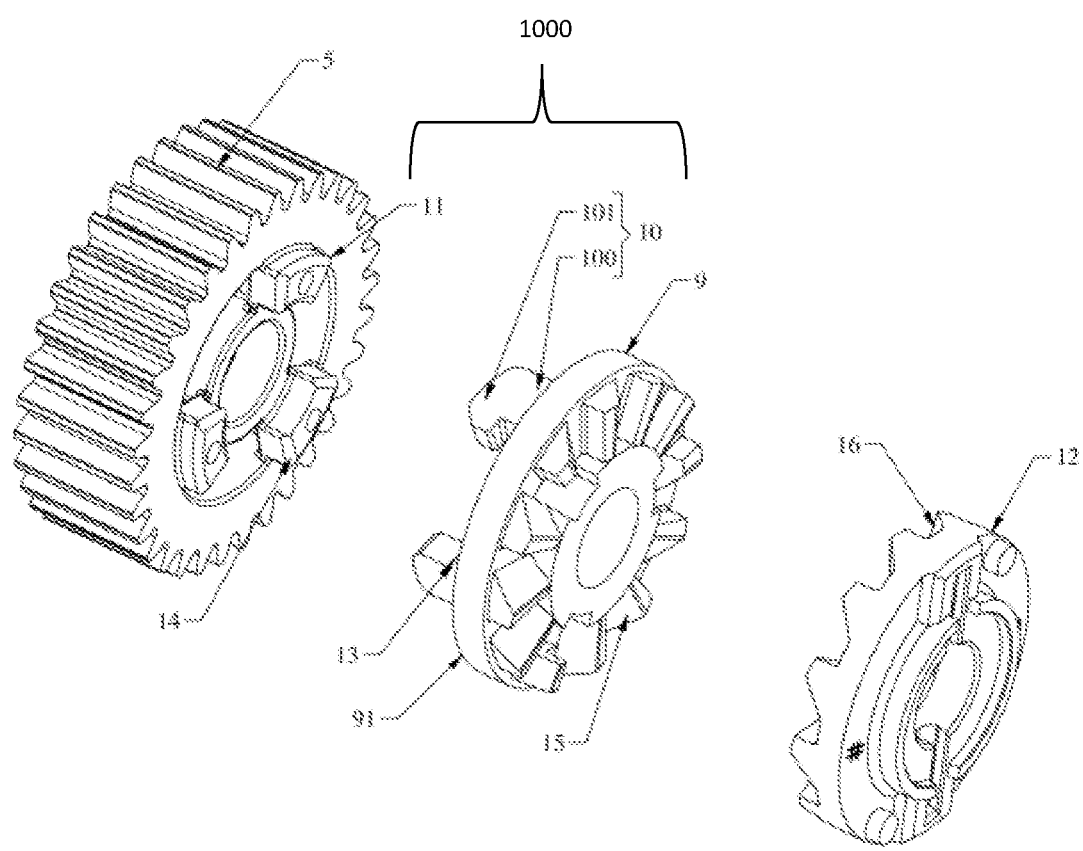
FIG. 3A represents an exploded partial view of the elements constituting a transmission according to the invention.
Figure 3B:
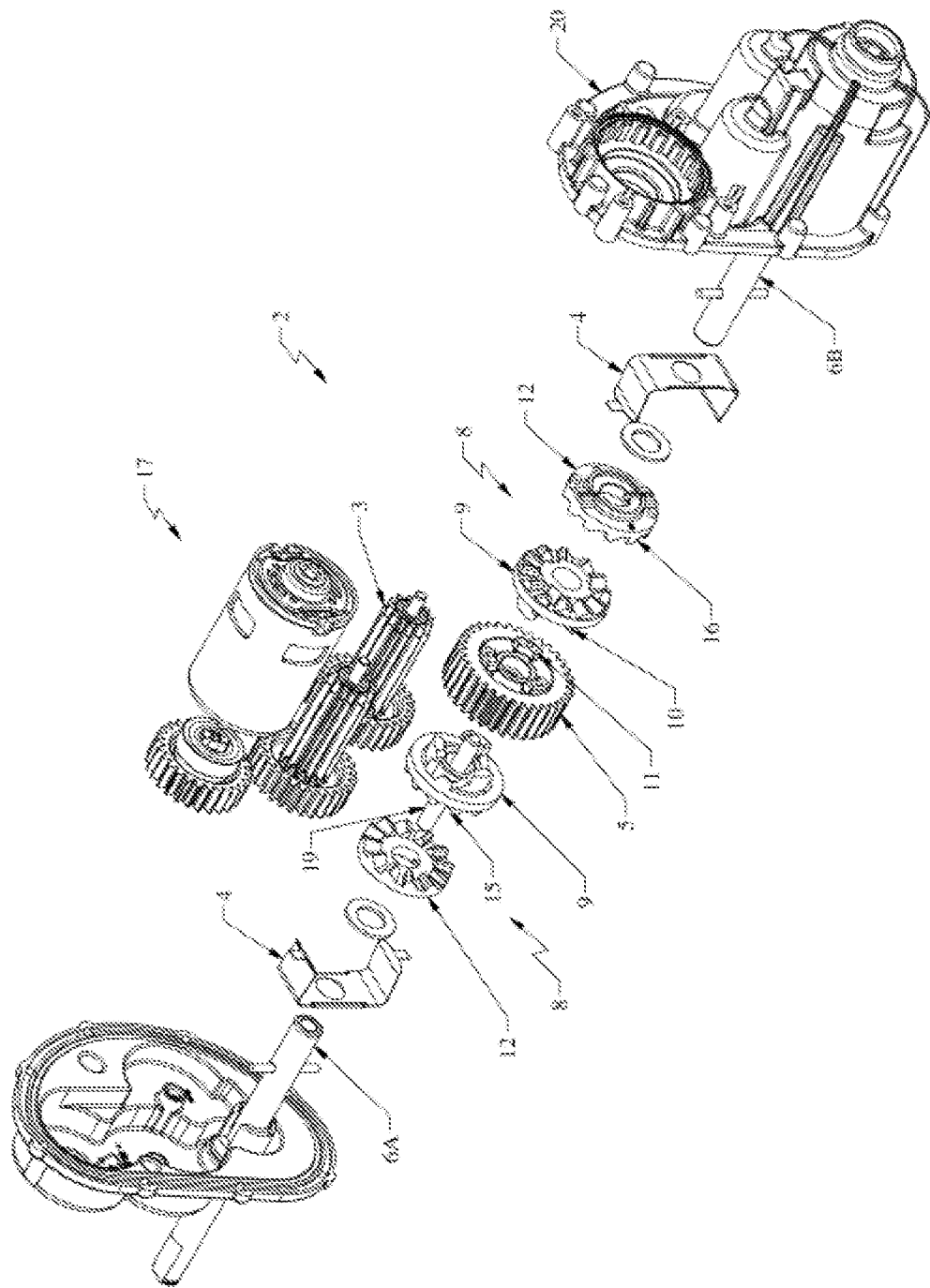
FIG. 3B represents another exploded partial view of the elements constituting a transmission according to the invention.
Figure 4:
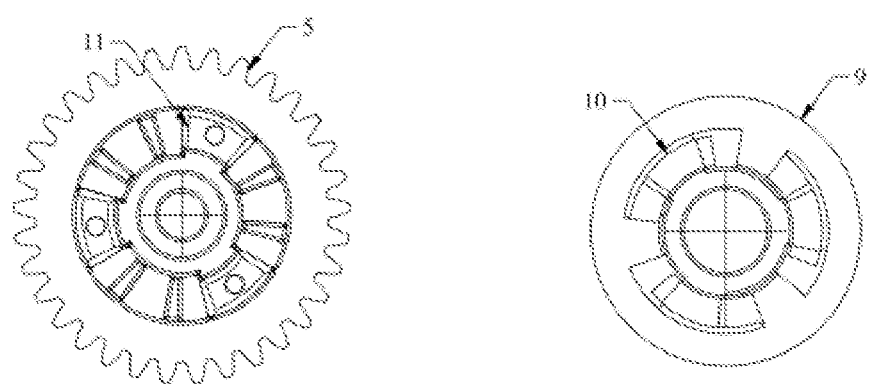
FIG. 4 represents a front view of the driven member and of the part of the or one of the axially mobile clutch mechanisms.
Figure 5:
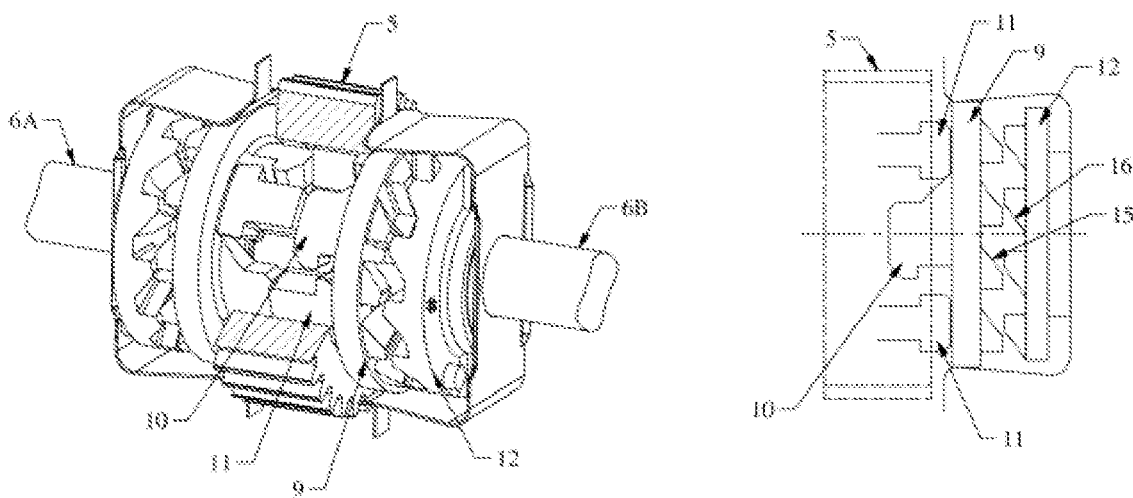
FIG. 5 represents, in the form of a perspective partial view and a partial schematic view, a transmission according to the invention when the clutch mechanism is in the deactivated state, that is to say in the declutched position.
Figure 6:
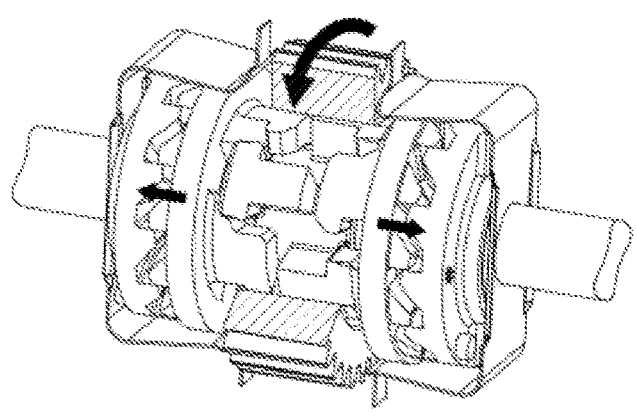
FIG. 6 represents, in the form of a perspective partial view and a partial schematic view, a transmission according to the invention when the clutch mechanism transitions from the deactivated state to the activated state by forwardly driving the driven member.
Figure 6:
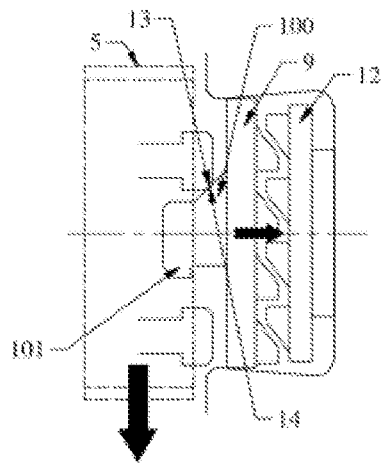
Figure 7:
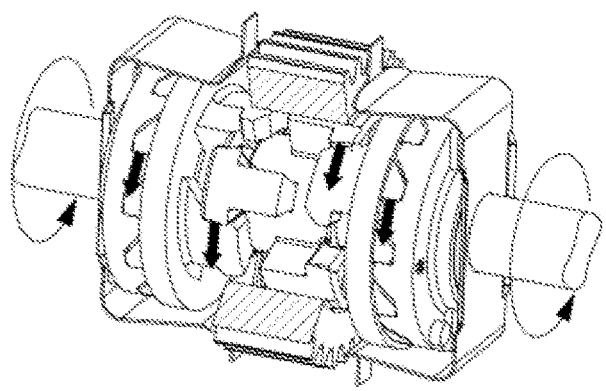
FIG. 7 represents, in the form of a perspective partial view and a partial schematic view, a transmission according to the invention when the clutch mechanism is in the activated state.
Figure 7:
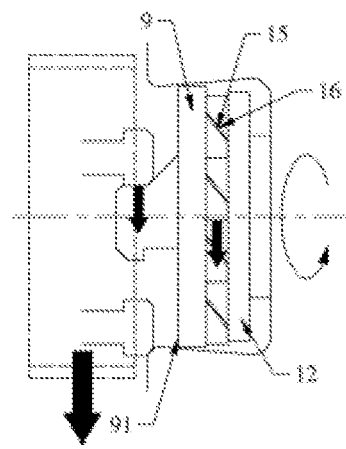

In the example represented in FIG. 3A, the toothed wheel constituting the driven member 5 has, on each of its faces, a ring of teeth with each tooth having a widened top giving the tooth the overall shape of a T. The horizontal branch of the T is provided, at each of its ends, with a bevel. One of the bevels forms a ramp 14 of the driven member 5 for an axial displacement of the clutch plate 91 in the direction of a movement away from the driven member 5.

The clutch plate 91 comprises, on its face turned toward the driven member 5, a ring of teeth with each tooth comprising one flank produced over at least a part of its length parallel to the axis of rotation of the wheel drive shaft sections and one flank produced over at least a part of its length inclined and forming an angle with said axis of rotation. The inclined flank part forms the ramp represented as 13 in the figures. This flank is the flank stressed in the forward driving of the driven member 5 by bearing contact with a tooth of the driven member 5 so as to bring about an axial displacement of the clutch plate in the direction of a movement away from the driven member 5. This displacement results from the bearing contact of the ramps 13 and 14. The other face of the clutch plate 91, that is to say the one turned toward the element 12 secured in rotation to the wheel drive shaft section, which in this instance is formed by a wheel or plate with ramps, comprises, likewise, a ring of teeth with flanks, one of them straight and the other inclined. The inclined flank of each tooth is represented as 15 in the figures and represents the ramp intended to cooperate with the element 12 for an axial displacement of the clutch plate 91 in the direction of a movement toward the driven member 5.

The element 12, secured in rotation to the wheel drive shaft section, also comprises a ring of teeth in which each tooth has one of its flanks inclined, and represented as 16 in the figures, and the other flank straight. For each tooth of the clutch plate 91 and of the element 12, a straight flank of a tooth of the clutch plate 91 cooperates with a straight flank of a tooth of the element 12 secured in rotation to the wheel drive shaft section during forward driving of the driven member 5, in the state with the clutch plate 91 away from the driven member 5. This cooperation by bearing contact continues at least as long as the rotational driving speed of the wheel drive shaft section or of the wheel drive shaft is less than the speed of the driven member 5.

When the speed of the wheel drive shaft 6 or of the wheel rotational drive shaft section becomes greater than the speed of rotation of the driven member 5, for example when making a turn with the wheel of the shaft forming the outside wheel in said turn, the drive shaft section and the element 12 become driving such that each tooth of the element 12 cooperates, on its ramp-forming inclined flank, represented as 16 in the figures, by bearing contact with the ramp-forming inclined flank represented as 15 of the teeth of the clutch plate 91 so as to bring about an axial displacement of the clutch plate 91 in the direction of a movement toward the driven member 5 as far as an uncoupled position of said ramps corresponding to the deactivated state of the clutch mechanism 8.

Figure 9:
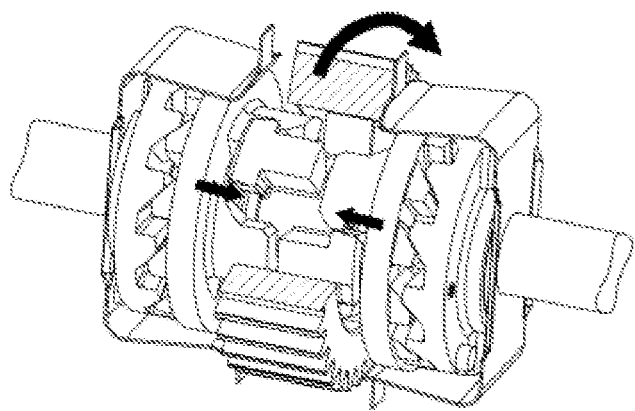
FIG. 9 represents, in the form of a perspective partial view and a partial schematic view, a transmission according to the invention when the clutch mechanism transitions from the activated state to the deactivated state with the driven member in the reversely driven state.
Figure 9:
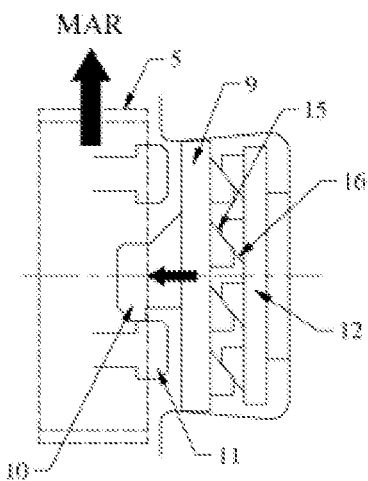

When the driven member 5 is driven in reverse, as FIG. 9 illustrates, following the reversal of direction of driving of the driving member 3 in rotation, it is once again the ramps 15 and 16 formed by the inclined flanks of the teeth of the clutch plate 91 and of the element 12 mounted secured in rotation to the wheel drive shaft section which are in bearing contact and bring about an axial displacement of the clutch plate 91 in the direction of a movement toward the driven member 5 as far as an uncoupled position of said ramps of the clutch plate 91 and of the element 12 corresponding to the deactivated state of the clutch mechanism 8.

This axial displacement is brought about when the rotational driving range of the driven member 5 extends over one revolution or less than one revolution of driving of said driven member 5 in rotation depending on the configurations of the ramps.

The relative speed variation between clutch plate 9 and element 12 secured in rotation to the wheel drive shaft section therefore automatically allows, when the element 12 becomes driving, a transition of the clutch mechanism 8 to the deactivated state when the driven member 5 is being driven forward, whereas the configuration of the ramps automatically brings about a deactivation when the driven member 5 is being driven in reverse.

Each clutch mechanism 8 comprises, for its operation, a permanently active brake 4 on the part 9 forming the clutch plate 91 of the or each clutch mechanism 8. This brake is, here, formed by a U-shaped leaf spring threaded onto the wheel drive shaft, the branches of said U bearing on the part 9 forming the clutch plate 91 of said clutch mechanism 8. The presence of this brake generates a permanent braking of the driving of said part 9 in angular displacement. The result of the design of the clutch mechanisms, as described above, is that each clutch mechanism 8 is activated by the driving of the driven member 5 in rotation in a first, so-called forward, rotational driving direction, and axial displacement of the part 9 of the clutch mechanism forming the clutch plate 91 in the direction of a movement away from the driven member 5 so as to engage with the element 12 secured in rotation to the shaft. In the activated state, the part 9 of the clutch mechanism 8 forming the clutch plate 91 is therefore disposed away from the driven member 5, that is to say distanced from the driven member 5 by a distance greater than that which separates it from the driven member 5 when the clutch mechanism 8 is in the deactivated state. The or each clutch mechanism 8 can be deactivated by driving the wheel drive shaft section 6A or 6B with which it cooperates in forward rotation, when the speed of rotation of the wheel drive shaft section is greater than the speed of rotation of the driven member 5. Greater speed is also understood to mean the case in which the driving member 3 is not driven in rotation, that is to say stopped.

In fact, during the stopping of the motor driving member 3, the inertia of the machine causes a continuation of the displacement of the machine by a value sufficient to drive the wheel drive shaft sections 6A and 6B of the vehicle in rotation and subsequently generate a deactivation of the clutch mechanisms 8.

Likewise, each clutch mechanism is designed to be deactivated, when the speed of rotation of the wheel drive shaft or the wheel drive shaft section which bears the clutch mechanism 8 is greater than the speed of rotation of the driven member 5, for example when taking a turn.

When the clutch mechanism is in the deactivated state, the wheel of the vehicle and the shaft section or the shaft which bears it can turn freely in both directions of rotation. Furthermore, each wheel of a pair of wheels of the vehicle can turn independently of the other wheel of the vehicle in the case of a shaft produced in the form of shaft sections.

The deactivation of the clutch mechanism can also be obtained by driving the driven member 5 in reverse rotation.

To allow the driven member 5 to be driven in forward or reverse, using the motor system 17 for driving the driving member 3 in rotation, the vehicle comprises a control system 18 of the motor system 17. This control system 18 comprises at least one manual control member, such as a handle or a lever, that is positioned on the handlebar of the vehicle and that can be actuated manually by the driver of the vehicle. Generally, this control system 18 is configured to allow manual control of the forward driving of the driven member 5 by actuation of the manual control member while the reverse driving of the driven member 5 can be done automatically, for example once the manual control member is released. As a variant, the reverse driving of the driven member 5 can also be controlled manually. To refine the operation of this transmission 2 and avoid the transition of the or each clutch mechanism 8 from the deactivated state to the activated state, when the driven member is in the state driven in reverse, the part 9 of the or each clutch mechanism 8 disposed, with the corresponding clutch mechanism 8 in the deactivated state, in a position close to the driven member 5 is, in said position, limited in axial displacement in the direction of a movement away from the driven member 5 when the driven member 5 is in the state driven in reverse. The transmission comprises an activatable/deactivatable system 1000 for limiting axial displacement of said at least one part 9 of the or each clutch mechanism 8 in the direction of a movement away from the driven member 5 when said at least one part is in the state positioned in a position close to the corresponding driven member with the clutch mechanism in the deactivated state, this system 1000 for limiting axial displacement of said at least one part 9 being active when the driven member 5 is in the state driven in reverse such that the part 9 of the or each clutch mechanism 8 disposed, with the corresponding clutch mechanism 8 in the deactivated state, in a position close to the driven member 5 is, in said position, limited in axial displacement in the direction of a movement away from the driven member 5 when the driven member 5 is in the state driven in reverse. To that end, the part 9 forming the clutch plate of the or each clutch mechanism 8 comprises, for limiting the axial displacement thereof in the direction of a movement away from the driven member 5, retaining elements 10 borne by said part 9. These retaining elements 10 are configured to, when the part 9 is in a position close to the driven member 5, and with the driven member 5 in the state driven in reverse, engage with complementary retaining elements 11 borne by the driven member 5. In the examples represented, the retaining elements 10 borne by the part 9 forming the clutch plate 91 take the form of hooks. These retaining elements 10 are disposed protruding from the face of the clutch plate 91 opposite the driven member 5. In particular, the retaining elements 10 borne by said part 9 have the overall shape of an L and comprise a first branch 100 starting on the clutch plate 91 and extending orthogonally to the clutch plate 91 in a direction parallel to the wheel drive shaft 6 and a second branch 101 orthogonal to the first branch 100. The activatable/deactivatable system 1000 for limiting axial displacement of said at least one part of the or each clutch mechanism in the direction of a movement away from the driven member, when said at least one part is in the state positioned in a position close to the corresponding driven member with the clutch mechanism in the deactivated state, comprises retaining elements 10 borne by said part 9, these retaining elements 10 being configured to, when said part 9 is in a position close to the driven member 5 and with the driven member 5 in the state driven in reverse, engage with complementary retaining elements 11 borne by the driven member.

These retaining elements 10 borne by the part 9 are disposed on a circle with a center situated at the wheel drive shaft 6. The center of the circle is in fact disposed on the axis of rotation of the wheel drive shaft 6. The complementary retaining elements 11 of the driven member 5 with which the retaining elements 10 borne by the part 9 of the clutch mechanism 8 engage when said part 9 is in a position close to the driven member 5 and when the driven member 5 is in the state driven in reverse, take the form of hooks disposed on a circle with a center situated at the wheel drive shaft 6. These hooks have the overall shape of a T. For the or at least one of the clutch mechanisms 8, the complementary retaining elements 11 of the driven member 5 with which the retaining elements 10 borne by the at least one part 9 of said clutch mechanism 8 engage, when said part 9 is in a position close to the driven member 5, and when the driven member 5 is in the state driven in reverse, take the form of hooks disposed on a circle with a center situated at the wheel drive shaft 6. These hooks of the driven member 5 are configured to interpenetrate with the retaining elements 10 of said at least one part 9 of said clutch mechanism 8 when said retaining elements 10 are in the state engaged with the complementary retaining elements 11.

It will be noted that, for reasons of simplicity, the ramps 13 of a face of the clutch plate 91 which cooperate, when the clutch mechanism 8 transitions from the deactivated state to the activated state, with the ramps 14 of the driven member 5 for an axial displacement of the clutch plate 91 in a first direction of movement away from the driven member 5, are formed on the retaining elements 10 borne by said clutch plate 91.

In fact, the teeth of the clutch plate 91 bearing the ramps 13 and the hooks of the retaining elements 10 are, here, produced in a single piece and the ramp 13, with which each retaining element 10 or tooth is equipped, is formed at the base of said retaining element 10 or of the tooth in the zone of connection of the retaining element 10 or the tooth to the clutch plate 91. Likewise, the ramps 14 of the driven member 5 with which the ramps 13 of a face of the clutch plate 91 cooperate, when the clutch mechanism 8 transitions from the deactivated state to the activated state, for an axial displacement of the clutch plate 91 in a direction of movement away from the driven member 5, are formed on the complementary retaining elements 11 borne by the driven member 5. The ramp-holding teeth and the complementary retaining elements 11 of the driven member 5 are therefore produced in a single piece.

Figure 8:
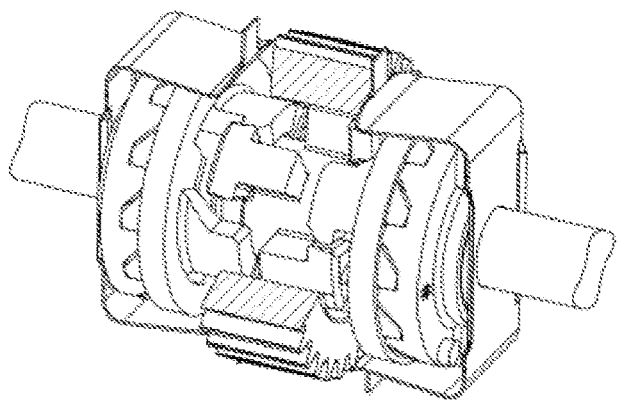
FIG. 8 represents, in the form of a perspective partial view and a partial schematic view, a transmission according to the invention when the clutch mechanism is in the activated state.
Figure 8:
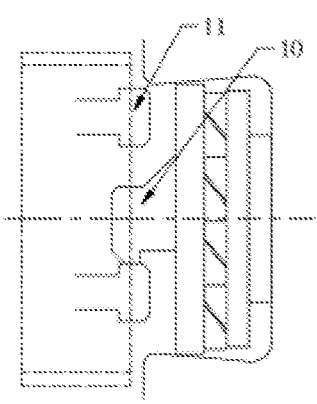
Figure 10:
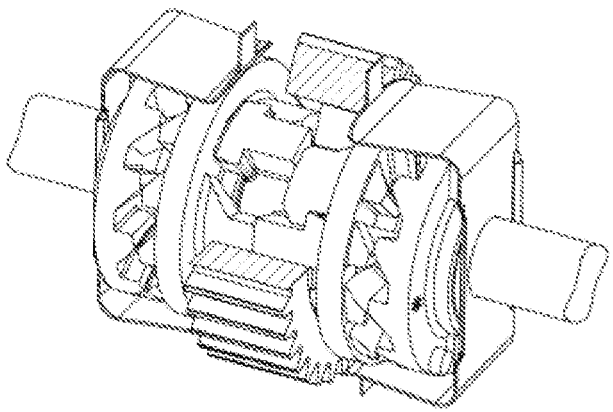
FIG. 10 represents, in the form of a perspective partial view and a partial schematic view, a transmission according to the invention when the clutch mechanism is in the deactivated state.
Figure 10:
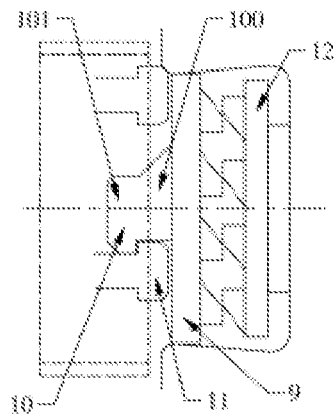

Thus, one end of the horizontal branch of the T of each tooth constituting the complementary retaining element 11 of the driven member 5 is capable of being inserted into the part of the constitutive hook of each retaining element 10 of the part 9 forming the clutch plate 91 in the link zone between the branches of the L-shaped hook such that, in this position, an axial displacement of the part 9 forming the clutch plate 91 in the direction of a movement away from the driven member 5 is prevented. Thus, when the clutch mechanism 8 is in the clutched state, as illustrated in FIG. 8, the reverse driving of the driven member 5 generates, by cooperation of the ramps 15 and 16 of the part 9 forming the clutch plate 91 and of the element 12 secured in rotation to the shaft 6, an axial displacement of the part 9 forming the clutch plate toward the driven member 5 as far as a position in which the retaining elements 10 of the part 9 forming the clutch plate and the complementary retaining elements 11 of the driven member 5 interpenetrate as illustrated in FIG. 10. In this position, any axial displacement of the part 9 forming the clutch plate 91 in the direction of a movement away from the driven member 5 is prevented.

The invention claimed is:

1. A transmission for a pedestrian-controlled wheeled vehicle, comprising:
   a driving member;
   a rotary driven member permanently engaged with the driving member;
   a driving means for driving wheels of a pair of wheels of the vehicle,
   said driving means comprising a wheel drive shaft produced either in a single piece driving said pair of wheels, or at least two coaxial wheel drive shaft sections each driving a wheel of the pair of wheels of the vehicle, and
   at least one clutch mechanism disposed between the wheel drive shaft or each of the wheel drive shaft sections, and the rotary driven member;
   wherein said at least one clutch mechanism comprising at least one part, mounted so as to be axially mobile on either the wheel drive shaft or the wheel drive shaft section with which said clutch mechanism cooperates, between a position away from the rotary driven member and a position close to the rotary driven member, the position away from the rotary driven member corresponding to an activated state of the clutch mechanism,
   wherein the position close to the rotary driven member corresponding to a deactivated state of the clutch mechanism, the at least one clutch mechanism can be activated by driving the rotary driven member in rotation in a first forward rotational driving direction, and that can be deactivated by driving the rotary driven member in rotation in a second reverse direction of rotation, counter to said first forward rotational driving direction, or by driving either the wheel drive shaft or the wheel drive shaft section with which the clutch mechanism cooperates in the forward rotational driving direction, when a speed of rotation of either the wheel drive shaft or the wheel drive shaft section is greater than a speed of rotation of the rotary driven member, either the wheel drive shaft or each wheel drive shaft section being, when the corresponding clutch mechanism is in the deactivated state, free to turn in either direction of rotation, wherein said at least one part of the at least one clutch mechanism which is disposed, when the clutch mechanism is in the deactivated state, in the position close to the rotary driven member, is, in said position, limited in axial displacement in a direction of a movement away from the rotary driven member, when the rotary driven member is in the reverse direction of rotation, wherein said at least one part of the at least one clutch mechanism comprises, for limiting the axial displacement thereof in the direction of the movement away from the rotary driven member, retaining elements that engage with complementary retaining elements borne by the rotary driven member.

2. The transmission for the wheeled vehicle as claimed in claim 1, wherein the retaining elements borne by said part are disposed on a circle with a center situated at the wheel drive shaft.

3. The transmission for the wheeled vehicle as claimed in claim 1, wherein the retaining elements borne by said part are hooks.

4. The transmission for the wheeled vehicle as claimed in claim 1, wherein said at least one part of the at least one clutch mechanism, disposed, when the clutch mechanism is in the deactivated state, in the position close to the rotary driven member is a clutch plate mounted, on either said wheel drive shaft or a respective wheel drive shaft section of the wheel drive sections, so as to be free to rotate and axially mobile, and in that the retaining elements borne by said part are disposed protruding from a face of the clutch plate towards the rotary driven member.

5. The transmission for the wheeled vehicle as claimed in claim 1, wherein said at least one part of the at least one clutch mechanism is disposed, when the clutch mechanism is in the activated state, away from the rotary driven member and engaged with an element borne by, and secured in rotation to, the wheel drive shaft or the wheel drive shaft section, and, when the clutch mechanism is in the deactivated state, close to the rotary driven member and uncoupled from the element borne by, and secured in rotation to, the wheel drive shaft or the wheel drive shaft section.

6. The transmission for the wheeled vehicle as claimed in claim 5, wherein
said at least one part of the at least one clutch mechanism is a clutch plate and the rotary driven member are provided, on each of their faces, with ramps, the ramps of one of the faces of the clutch plate cooperating, when the clutch mechanism transitions from the deactivated state to the activated state, with the ramps of the rotary driven member for the axial displacement of the clutch plate in the direction of the movement away from the rotary driven member and securing the clutch plate with the element borne by, and secured in rotation to, the wheel drive shaft or the wheel drive shaft section,
the ramps of the other face of the clutch plate cooperating, when the clutch mechanism transitions from the activated state to the deactivated state, with ramps of the element borne by, and secured in rotation to, the wheel drive shaft or the wheel drive shaft section so as to bring about, by axial displacement in the opposite direction of the movement away of said clutch plate, free-wheeling of the wheel drive shaft or of the wheel drive shaft section.

7. The transmission for the wheeled vehicle as claimed in claim 6, wherein the ramps of the one face of the clutch plate which cooperate, when the clutch mechanism transitions from the deactivated state to the activated state, with the ramps of the rotary driven member for the axial displacement of the clutch plate in the direction of the movement away from the rotary driven member are formed on the retaining elements borne by said clutch plate.

8. The transmission for the wheeled vehicle as claimed in claim 6, wherein the ramps of the rotary driven member with which the ramps of the one face of the clutch plate cooperate, when the clutch mechanism transitions from the deactivated state to the activated state, for the axial displacement of the clutch plate in the direction of the movement away from the rotary driven member are formed on the complementary retaining elements borne by the rotary driven member.

9. The transmission for the wheeled vehicle as claimed in claim 6, wherein the retaining elements borne by said part have an L shape and comprise a first branch starting on the clutch plate and extending orthogonally to the clutch plate in a direction parallel to the wheel drive shaft and a second branch orthogonal to the first branch.

10. The transmission for the wheeled vehicle as claimed in claim 1, wherein, for the at least one clutch mechanism, the complementary retaining elements of the rotary driven member with which the retaining elements borne by the at least one part of said clutch mechanism engage, when said part is in the position close to the rotary driven member and when the rotary driven member is in the reverse direction of rotation, are hooks disposed on a circle with a center situated at the wheel drive shaft, said hooks of the rotary driven member being configured to interpenetrate with the retaining elements of said at least one part of said clutch mechanism when said retaining elements are in a state engaged with the complementary retaining elements.

11. The transmission for the wheeled vehicle as claimed in claim 1, wherein said driving means comprises a motor system for driving the driving member in rotation configured to allow the rotary driven member to be driven in the forward rotational driving direction, and the rotary driven member to be driven in the reverse direction of rotation.

12. The transmission for the wheeled vehicle as claimed in claim 1, wherein said transmission comprises a control system of a motor system for driving the driving member in rotation.

13. A pedestrian-controlled wheeled vehicle, wherein said pedestrian-controlled wheeled vehicle is equipped with the transmission as claimed in claim 1.

* * * * *